United States Patent
Sporri (10) Patent No.: US 10,148,584 B2
(45) Date of Patent: Dec. 4, 2018

(54) ADAPTIVE COMPRESSION

(71) Applicant: CA, Inc., New York, NY (US)

(72) Inventor: Heinz Sporri, Hyderabad (IN)

(73) Assignee: CA, Inc., New York, NY (US)

( * ) Notice: Subject to any disclaimer, the term of this patent is extended or adjusted under 35 U.S.C. 154(b) by 250 days.

(21) Appl. No.: 14/569,846

(22) Filed: Dec. 15, 2014

(65) Prior Publication Data

US 2016/0173399 A1 Jun. 16, 2016

(51) Int. Cl.
*G06F 15/16* (2006.01)
*H04L 12/811* (2013.01)
*H04L 29/06* (2006.01)
*H04L 29/08* (2006.01)

(52) U.S. Cl.
CPC ............. *H04L 47/38* (2013.01); *H04L 67/06* (2013.01); *H04L 69/04* (2013.01)

(58) Field of Classification Search
CPC .......... H04L 47/38; H04L 67/06; H04L 69/04
USPC .......................................................... 709/246
See application file for complete search history.

(56) References Cited

U.S. PATENT DOCUMENTS

| 8,620,163 B1* | 12/2013 | Sleator | H04B 10/116 |
| | | | 348/116 |
| 2002/0107988 A1* | 8/2002 | Jordan | H04N 21/234327 |
| | | | 709/247 |
| 2004/0008650 A1* | 1/2004 | Le | H04L 69/04 |
| | | | 370/338 |
| 2007/0104118 A1* | 5/2007 | Mega | H04L 43/00 |
| | | | 370/254 |
| 2008/0075059 A1* | 3/2008 | Kermoal | H04W 16/14 |
| | | | 370/343 |
| 2008/0077702 A1* | 3/2008 | Posamentier | H04L 12/5695 |
| | | | 709/232 |
| 2009/0327698 A1* | 12/2009 | Baker | H04L 63/061 |
| | | | 713/153 |
| 2011/0016180 A1* | 1/2011 | Bharadhwaj | G06Q 10/10 |
| | | | 709/205 |
| 2013/0019029 A1* | 1/2013 | Jagmohan | H03M 7/3068 |
| | | | 709/247 |

(Continued)

*Primary Examiner* — Brian Whipple
*Assistant Examiner* — Hannah S Wang
(74) *Attorney, Agent, or Firm* — Meyertons, Hood, Kivlin, Kowert & Goetzel, P.C.

(57) ABSTRACT

A method for performing a file transfer comprises receiving a request for data where the data is to be compressed. A checkpoint is established, where the checkpoint occurs before the end of the transmission of the requested data. Also, a compression requirement is established for the requested data. The operations of extracting a segment of the data to be communicated, processing the extracted segment according to the compression requirement, and communicating the processed segment across the network are performed until the checkpoint is reached. Once the established checkpoint is reached, a checkpoint routine is performed by determining whether a desired level of performance in compression is achieved in communicating the processed segments. If the desired level of performance is achieved, each additional segment is processed based upon the compression requirement. Alternatively, the compression requirement is modified and each additional segment is processed according to the modified compression requirement.

20 Claims, 7 Drawing Sheets

(56) References Cited

U.S. PATENT DOCUMENTS

| | | | | |
|---|---|---|---|---|
| 2013/0054838 A1* | 2/2013 | Tripathi | ............ | H03M 7/6082 |
| | | | | 709/247 |
| 2013/0332660 A1* | 12/2013 | Talagala | ............ | G06F 12/0246 |
| | | | | 711/103 |
| 2014/0325054 A1* | 10/2014 | Agrawal | ............ | G06F 11/3419 |
| | | | | 709/224 |
| 2015/0341804 A1* | 11/2015 | Syrjarinne | ............ | H04W 24/02 |

* cited by examiner

ADAPTIVE COMPRESSION

BACKGROUND

Various aspects of the present disclosure relate generally to file transfers and more specifically to the use of adaptive compression to implement file transfers from a mainframe computer to a remote computer.

A mainframe computer is a type of computer system that is particularly well suited for bulk data processing. In this regard, mainframe computers are capable of managing massive amounts of stored data, provide for high volume input, output, and throughput processing, and exhibit high stability and reliability. Accordingly, mainframe computers are expensive to own and operate. As such, to conserve costs, a business may lease the use of a mainframe computer that is shared with other users. In this regard, each business may pay its share of the use of the mainframe computer based upon the central processing unit (CPU) consumption utilized or reserved by that business. For example, it is not uncommon for a business to be charged based upon a measure commonly referred to as millions of instructions per second (MIPS), which can be directly associated with the enterprise applications and processes executed by the mainframe computer on behalf of each business.

BRIEF SUMMARY

According to aspects of the present disclosure, a method of performing a file transfer is provided. The method comprises receiving, by a first machine (e.g., a mainframe computer), a request for data to be communicated across a network to a second machine, where the data to be received by the second machine is to be compressed. The method also comprises establishing a checkpoint that is known to both the first machine and the second machine, where the checkpoint occurs before the end of the transmission of the requested data. Also, the method comprises establishing a compression requirement for the requested data.

The method further comprises performing, until the checkpoint is reached, the operations of extracting a segment of the data to be communicated as an extracted segment, processing the extracted segment according to the compression requirement defining a processed segment, and communicating the processed segment across the network to the second machine as a transmitted segment.

The method yet further comprises performing a checkpoint routine once the established checkpoint is reached, by determining whether a desired level of performance in compression is achieved in communicating the processed segments to the second machine. Yet further, the method comprises extracting at least one additional segment of the data. The method further comprises processing each additional segment based upon the compression requirement where the desired level of performance is achieved. The method also comprises modifying the compression requirement to a modified compression requirement and processing each additional segment based upon the modified compression requirement where the desired level of performance is not achieved. The method still further comprises communicating each additional processed segment across the network to the second machine.

DETAILED DESCRIPTION

According to aspects of the present disclosure, a compression method is provided that allows a compression algorithm applied to data communicated across a network to be changed 'in flight' or "on the fly". That is, the compression algorithm may be altered before all of the requested data is compressed, without starting the process over with regard to data already communicated across the network.

By way of example, assume that a first machine (Machine A, e.g., a mainframe computer) receives a request for data to be communicated across a network to a second machine (Machine B), where the data received by Machine B is to be compressed. In response to the request, Machine A begins to extract the requested data from storage, compress the extracted data, and transmit the compressed data to Machine B. If the data to be transmitted from Machine A to Machine B had been previously compressed (e.g., stored on a disk in a compressed form), the compression process performed to satisfy the request will lead to wasted central processing unit (CPU) cycles, an increase in execution time and greater network traffic. However, according to aspects of the present disclosure set out in greater detail herein, an adaptive compression is applied, which allows the applied compression to be altered without interrupting and re-starting the transfer of the requested data, thus reducing wasted CPU cycles, reducing execution time, and reducing network traffic.

Figure 1:
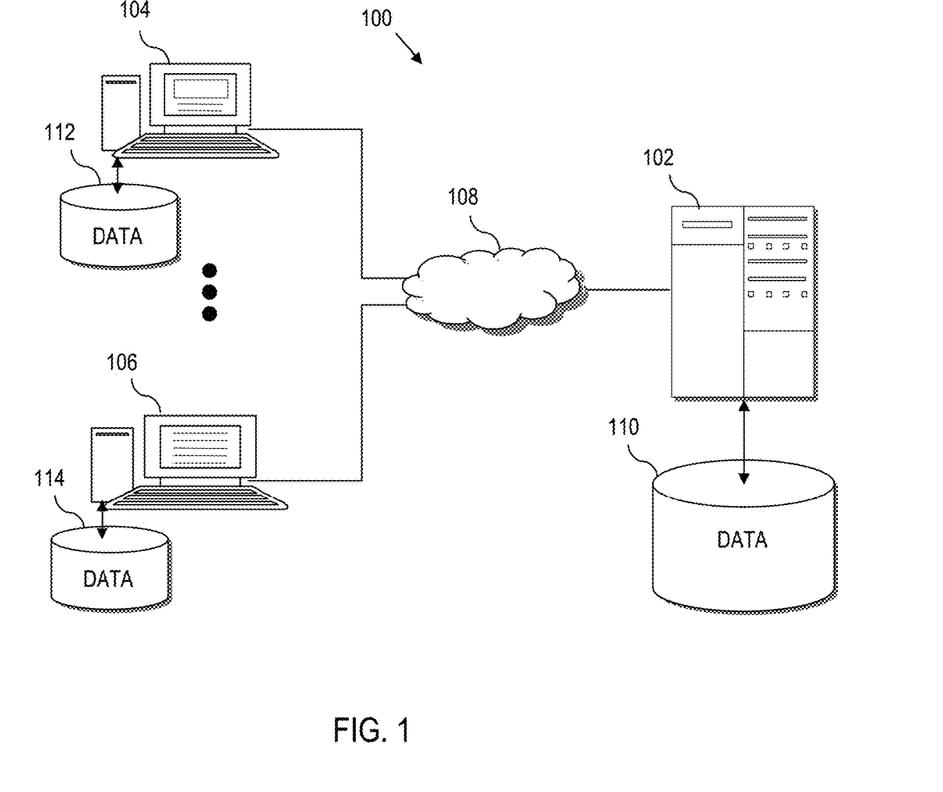
FIG. 1 is a block diagram illustrating an exemplary system where remote machines can issue file transfer requests to a mainframe computer across a network environment, according to various aspects of the present disclosure.

General Overview:

Referring to drawings and in particular FIG. 1, a network system 100 is illustrated according to aspects of the present disclosure herein. Generally, a processing device designated as a first machine 102 communicates with one or more remote processing devices, e.g., a second machine 104 and a third machine 106, across a network 108. The second machine 104 and third machine 106 are illustrated solely for purposes of simplified explanation. In practice, one or more remote devices may communicate with the first machine 102. The first machine 102 may comprise a mainframe computer, server computer, or other processing device that is capable of responding to data transfer requests, as will be described in greater detail herein. In this regard, the first machine 102 has access to storage 110, e.g., any form of storage, including disk(s), network addressed storage (NAS), file server(s), a cloud based storage or other structure where data can be retrieved.

The second machine 104 and third machine 106 may each comprise any processing device that is capable of communicating over the network 108 to request and/or receive data from the first machine 102. For instance, typical processing devices include server computers, personal computers, notebook computers, and tablets. The second machine 104 or third machine 106 may also comprise by way of example, transactional systems, purpose-driven appliances, cellular devices including smart telephones, and special purpose computing devices.

For purposes of discussion herein, the second machine 104 has access to storage 112 where data received from the first machine 102 is to be stored. Likewise, the third machine 106 has access to storage 114 where data received from the first machine 102 is to be stored.

The network 108 provides communication links between the various processing devices, e.g., the first machine 102, the second machine 104, and the third machine 106. Accordingly, the network 108 may be supported by networking components such as routers, hubs, firewalls, network interfaces, wired or wireless communication links and corresponding interconnections, cellular stations and corresponding cellular conversion technologies, e.g., to convert between cellular and TCP/IP, etc. Such devices are not shown for purposes of clarity. Moreover, the network 108 may comprise connections using one or more intranets, extranets, local area networks (LAN), wide area networks (WAN), wireless networks (WIFI), the Internet, including the world wide web, a cloud, and/or other arrangements for enabling communication between the processing devices, in either real time or otherwise, e.g., via time shifting, batch processing, etc.

The network system 100 is shown by way of illustration, and not by way of limitation, as a computing environment in which various aspects of the present disclosure may be practiced. Other configurations may alternatively be implemented.

Adaptive Compression Overview:

In operation, assume that the first machine 102 receives a request for data. The request may come from the second machine 104, from a third party machine, from the first machine 102, etc. Further, assume that the request includes a condition that the data is to be compressed. In response to receiving the request, the first machine 102 begins the process of retrieving the requested data from storage 110, compressing the data, and transmitting the data to the second machine 104. In this process, a significant amount of the CPU resources are spent on compressing the data.

It is possible that the requested data stored in the storage 110 is already compressed. If this is the case, then compressing the file again is not likely to make the size of the requested data smaller. Rather, the size of the requested data may actually increase due to the nature of the compression routine. As such, the first machine 102 may be wasting CPU cycles compressing data that does not need to be compressed. Moreover, the first machine 102 may ultimately waste even more CPU cycles transmitting the data where the overall size of the data increases due to the compression applied before transmitting. This can lead to large amounts of unnecessary cost incurred to process the request for data.

Notably, if a file is incompressible in its first part, it is likely that the file will also be incompressible in its latter part as well. Accordingly, during a file transfer, one or more checkpoints are set. Those checkpoints can be used to verify that a desired level of performance is achieved. For instance, the desired level of performance may be measured by a compression characteristic such as a desired compression ratio. If the level of performance, e.g., the compression ratio in the above example, is not reached, the compression characteristic(s) can be adjusted.

To maintain synchronization, both the first machine 102 and the second machine 104 execute corresponding adaptive compression routines that are synchronized based upon the checkpoint. The processing of the first machine, e.g., the mainframe computer, is discussed with reference to FIG. 2. The processing of the second machine, i.e., the requesting machine, is discussed with reference to FIG. 3.

Figure 2:
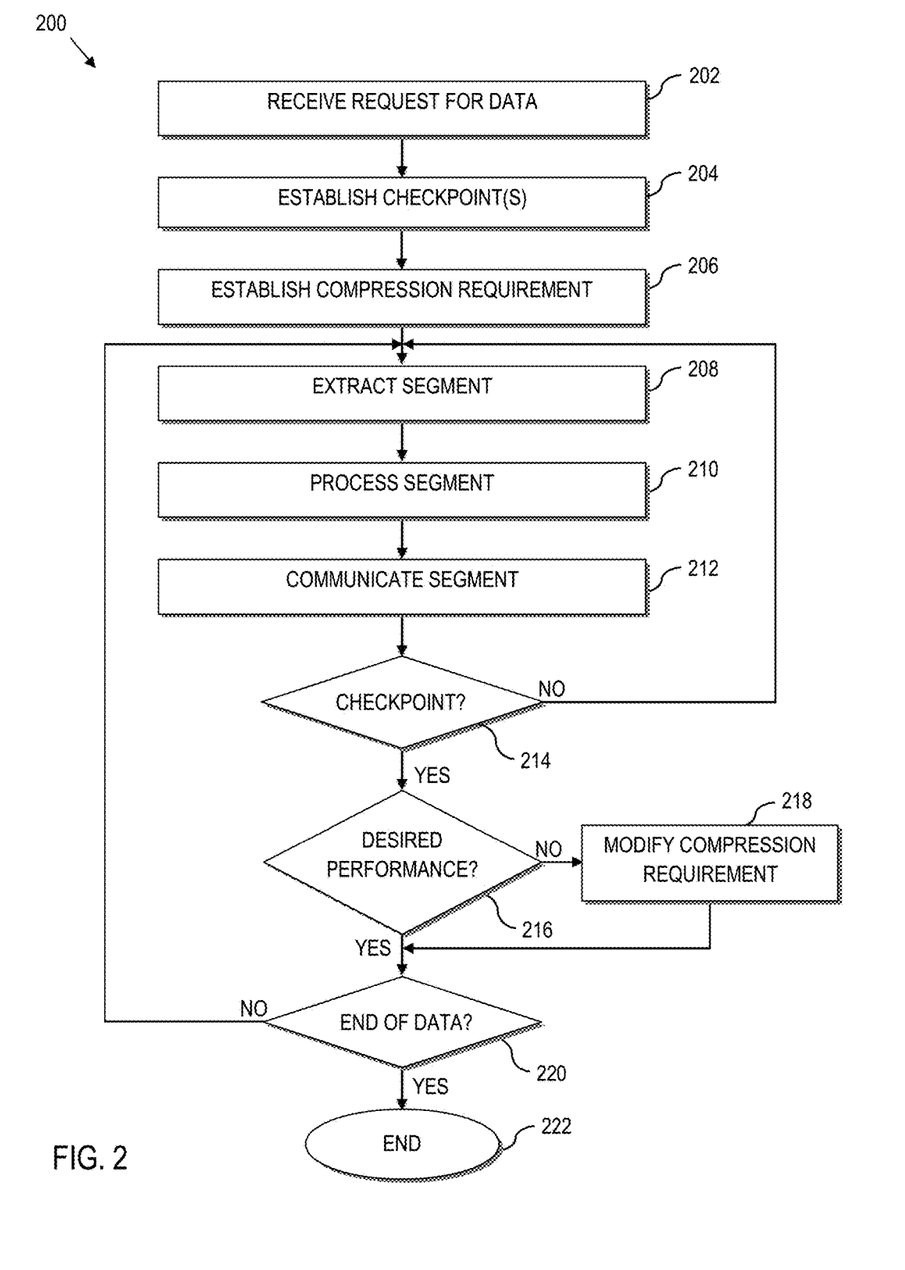
FIG. 2 is a flow chart illustrating a method for responding to a file transfer request, where the request requires that the file is compressed, according to various aspects of the present disclosure.

Request Receiving Machine:

Referring to FIG. 2, an algorithm illustrates a machine-executable method 200, which may be executed on a computer system for performing adaptive compression. In this regard, the method 200 may be implemented on computer-readable hardware that stores machine-executable program code, where the program code instructs a processor to implement the described method. The method 200 may also be executed by a processor coupled to memory, where the processor is programmed by program code stored in the memory, to perform the described method.

The method comprises receiving at 202, by a first machine (e.g., the first machine 102 of FIG. 1), a request for data to be communicated across a network to a second machine (e.g., the second machine 104 of FIG. 1), where the data received by the second machine is to be compressed. The request may come from the second machine, from a third party machine, from the first machine itself etc. Moreover, the first machine may receive the request as a file transfer request that specifies a requirement that the requested file is compressed.

The method also comprises establishing at 204, a checkpoint that is known to both the first machine and the second machine. In this regard, the checkpoint occurs before the end of the transmission of the requested data. For instance, a checkpoint may be established between the first machine and the second machine based upon a predetermined amount of the data that is to be transmitted before the checkpoint occurs. As an illustrative example, where the response to the request for data comprises transmitting database records, the checkpoint may be based upon a predetermined number of records. For instance, where 10,000+ records are to be transmitted to the second machine, a checkpoint may be established at 1,000 records. As another example, more than one checkpoint may be established. For instance, a checkpoint may be established every 1,000 records. As another example, where the data to be transmitted is some form of media data, e.g., video, audio, etc., the checkpoint can be every 50 megabytes (MB) of data. The above are examples only and other types of checkpoints may be established.

The method also comprises establishing at 206 a compression requirement for the requested data. The compression requirement may be implemented as a set of parameters, as a file or data structure, hardcoded, etc. Still further, the first machine and the second machine may negotiate a compression requirement either before or as part of a specific data transfer request. In this regard, the data defining the compression requirement may be fixed, stored as a set of variables, user definable, dynamically established, etc.

As will be described in greater detail herein, the compression requirement may establish a predetermined compression algorithm to use for the exchange between the first machine and the second machine before receiving the request. For instance, the compression requirement may specify that when a transfer is initiated, the compression algorithm will be the ZLIB9 compression. Alternatively, other compression algorithms could be selected.

Still further, the compression requirement may establish the compression algorithm based upon a rules engine that selects one or more parameters based upon one or more rules. For instance, the rules engine may select the specific compression algorithm based upon the type of file requested. Thus, a compression routine may be selected that is optimized for the data to be provided. As another example, the rules engine may select the compression algorithm based upon data or metadata related to the requesting machine, the request responding machine, or both. For instance, a rules engine may select the compression algorithm based upon time (e.g., day, date, time of day, etc.), location of the data, the manner in which the data is transmitted (e.g., network protocol used), as a few examples.

The compression requirement may also comprise one or more rules that are evaluated to test the effectiveness of the identified compression algorithm. For instance, a rule may state that if the size of a data segment after compression is applied, is larger than the size of that same data segment before the compression is applied, then it is possible that the data is already stored in a compressed state. As a further example, the compression requirement may include one or more rules that can modify the performance of the file transfer request if a level of performance is not achieved, e.g., the compression ratio does not hit a target compression ratio or other suitable factor.

As will be described in greater detail, the result of failing the test may be a change in the compression algorithm, a change in parameters used to control the existing compression algorithm, defeating compression altogether, selecting a new compression algorithm, or other actions.

Thus, the checkpoint and compression requirement may be predetermined, e.g., known in advance of receiving the data request. Alternatively, the checkpoint and compression requirement may be specified at the time of the request, e.g., the request for data may include a designation of a desired compression requirement, a desired checkpoint, or both. Still further, in response to the request, the first machine and the second machine may negotiate the checkpoint and compression requirement.

In illustrative implementations, establishing the checkpoint at 204, and establishing the compression requirement at 206, may be performed in any order.

The method 200 further comprises performing until the checkpoint is reached, extracting at 208 a segment of the data to be communicated as an extracted segment, processing at 210, the extracted segment according to the compression requirement defining a processed segment, and communicating at 212, the processed segment across the network to the second machine as a transmitted segment.

For instance, it is likely that a file or other responsive data that is communicated in response to a data request will be too large to transmit in a single operation. As an illustrative example, a response to a request may require sending tens of thousands of records. As such, the first machine retrieves a first segment, e.g., a first group of the responsive records, processes the group, e.g., by applying compression, and transmitting the compressed records to the second machine. This loop continues until the first checkpoint is reached, e.g., 1,000 records have been transmitted.

A determination is made at 214 as to whether the checkpoint has been reached. If the checkpoint has not been reached, the method 200 loops back to 208 to continue processing data segments.

However, once the method 200 reaches the checkpoint, a determination is made at 216, as to whether a desired level of performance is achieved. For instance, in determining whether a desired level of performance is achieved in communicating the processed segments to the second machine, the method 200 may determine whether compressing the data segments according to the designated compression requirement (e.g., using the designated compression algorithm) has obtained a desired compression ratio. As another example, the method 200 may compare a size of the transmitted segments to the size of the extracted segments. As noted in greater detail herein, compressing already compressed data may result in the twice-compressed data being larger in file size than the data that has been compressed only once. As such, the method may compare the size of a data segment (or an aggregated total of the size of the data segments up to the checkpoint that have been transmitted to the second machine), to the same segment(s) stored on disk. If the size of the transmitted data segments exceeds the size of the data segments stored on disk, there is a good chance that the data is already compressed.

If a desired level of performance is not achieved at 216, then the method 200 comprises modifying the compression requirement at 218. As a simplified example, the method 200 may modify the compression requirement by turning off compression altogether. As another example, the method 200 may modify at least one parameter of the compression requirement, change the compression algorithm, or replace the current algorithm with an algorithm more suited to the particular data being transmitted. Thus, the method 200 may select a different compression algorithm altogether.

If a desired level of performance is achieved at 216, then processing continues without change. A check is made at 220 to determine whether the data request has reached the end of the data. If the entirety of the requested data has been transmitted to the second machine, then the process terminates at 222. Otherwise, the method loops back to extract the next segment at 208.

As such, the method 200 performs extracting at least one additional segment of the data, e.g., the method may process until a next predetermined checkpoint, or the method may process until the end of the requested data is reached. The method comprises processing each additional segment based upon the compression requirement where the desired level of performance is achieved, i.e., where the check at 216 indicates that a desired level of performance has been reached, and processing each additional segment at 218 based upon the modified compression requirement where the desired level of performance is not achieved at 216. The method 200 still further comprises communicating each additional processed segment across the network to the second machine.

Figure 3:
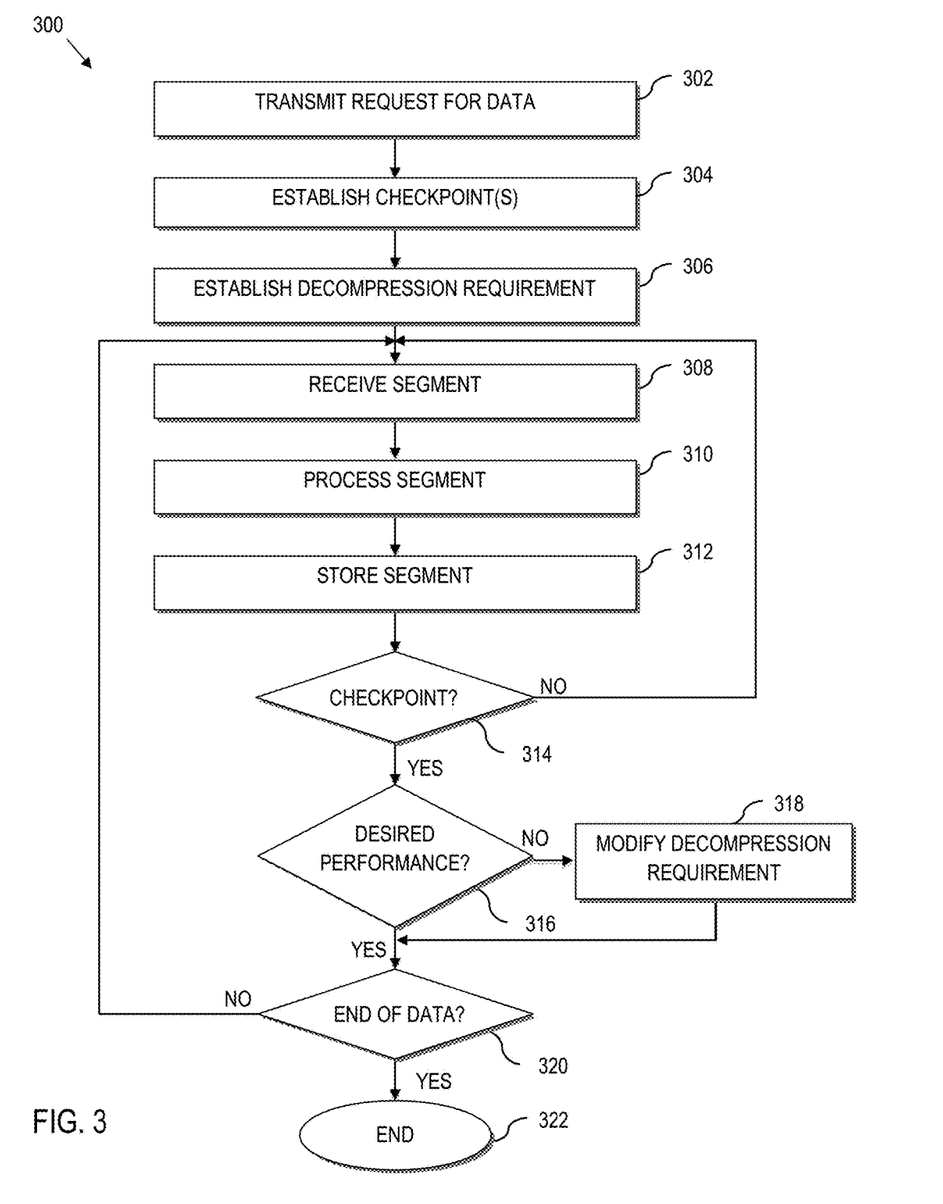
FIG. 3 is a flow chart illustrating a method for issuing a file transfer request, where the request requires that the file is compressed, according to various aspects of the present disclosure.

Request Issuing Machine:

Referring to FIG. 3, an algorithm illustrates a machine-executable method 300, which may be executed on a computer system for performing adaptive decompression. This algorithm executes on the machine requesting data from the mainframe, and is configured in an analogous manner to the algorithm of the method 200 of FIG. 2. In this regard, the method 300 may be implemented on computer-readable hardware that stores machine-executable program code, where the program code instructs a processor to implement the described method. The method 300 may also be executed by a processor coupled to memory, where the processor is programmed by program code stored in the memory, to perform the described method.

The method 300 comprises transmitting at 302 a request for data to be communicated across a network from a first machine (e.g., the first machine 102 of FIG. 1), to a second machine, (e.g., the second machine 104 of FIG. 1), where the data received by the second machine is to be compressed. Here, the request may come from the second machine, a third party machine, from the first machine itself, etc.

The method 300 also comprises establishing at 304, a checkpoint that is known to both the first machine and the second machine, where the checkpoint occurs before the end of the transmission of the requested data. Establishing the checkpoint is analogous to that described in greater detail with regard to FIG. 2. (See discussion at 204).

The method 300 comprises establishing at 306, a decompression requirement for the requested data. For instance, the decompression requirement may be determined by establishing a predetermined decompression algorithm between the first machine and the second machine. Here, the decompression algorithm is based upon the selected compression algorithm implemented by the first computer. Establishing the decompression requirement is analogous to that described with regard to FIG. 2. (See discussion at 206).

Still further, the method 300 may comprise transmitting in the request for data, to the first machine, a designation of a desired compression requirement, a desired checkpoint, or both. Alternatively, the checkpoint, compression requirement, or both may be determined before the data request is issued as described more fully herein.

The method 300 still further comprises performing in a loop until the checkpoint is reached, receiving at 308, a segment of the requested data, processing at 310, the received segment according to the decompression requirement, defining a processed segment, and storing at 312, the processed segment on a storage device accessible to the second machine.

The method yet further comprises checking at 314 to determine whether the checkpoint is reached. If the checkpoint has not been reached, the method 300 loops back to 308 to process a next segment of data that has been received.

The method 300 comprises performing a checkpoint routine once the designated checkpoint is reached at 314. The checkpoint routine comprises determining at 316, whether a desired level of performance is achieved in storing the processed segments. For instance, the method 300 may determine whether the decompression requirement has obtained a desired decompression ratio. As another example, the method 300 may compare a size of the received segments to the size of the stored segments. In an example implementation, determining the desired level of performance is analogous in scope to the check performed at 216 of FIG. 2. In this regard, the method 300 may include the same test as used by the first machine, e.g., via a rules engine, hard coded test, etc., as described with reference to FIG. 2.

If the desired level of performance is not achieved, the method 300 comprises modifying the decompression requirement at 318. The modification is analogous to that implemented by the first machine in the method 200 of FIG. 2 at 218. For instance, the method 300 may turn decompression off, modify a decompression parameter, select or otherwise switch to a different decompression algorithm, etc.

If the check at 316 indicates that the desired level of performance is reached, or upon modifying the decompression requirement at 318, the method 300 determines whether it has reached the end of the requested data.

If a check determines at 320 that the end of the data has been obtained, then the method stops at 322. Otherwise, the method 300 loops back to process additional information. For instance, the method 300 may receive at least one additional segment of the requested data, process each additional received segment according to the compression requirement where the desired level of performance is achieved, and process each additional received segment according to a modified compression requirement where the desired level of performance is not achieved. Also, the method comprises storing each additional processed segment on the storage device accessible to the second machine.

End to End Example 1

Figure 4:
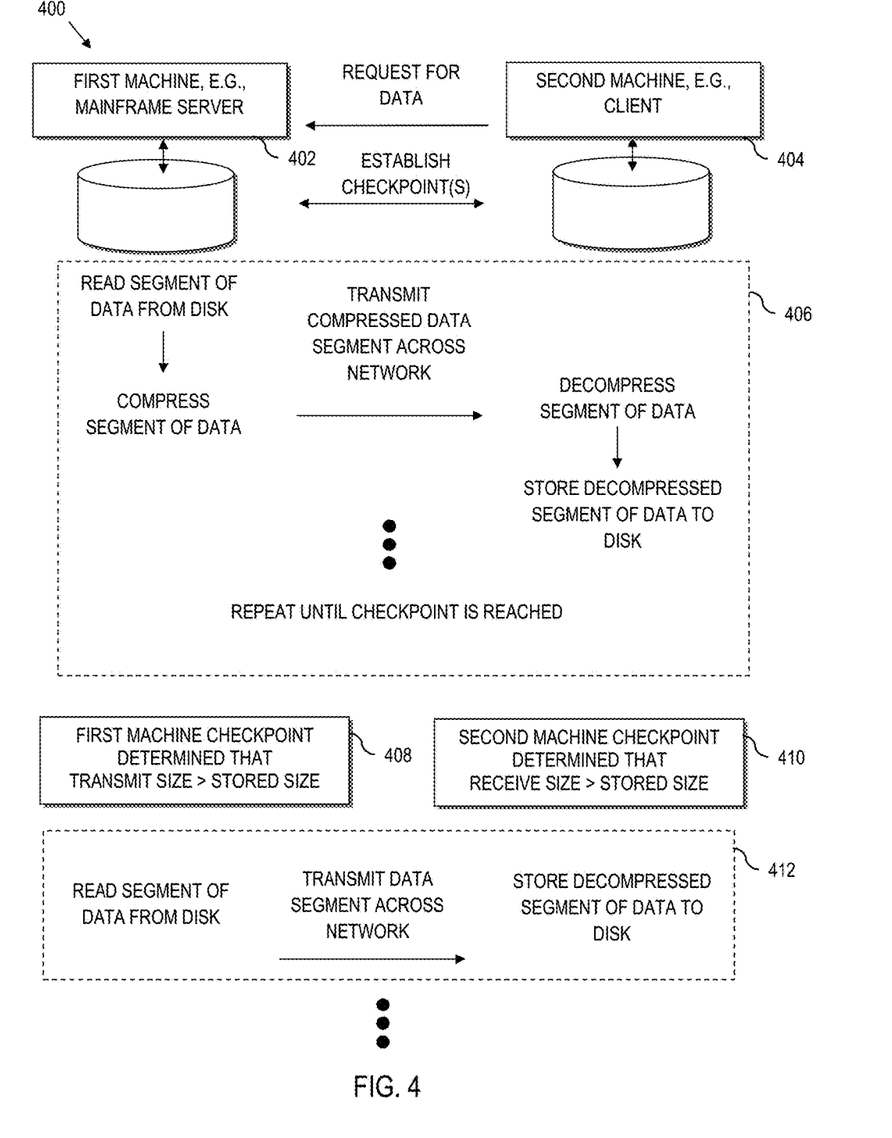
FIG. 4 is a block diagram illustrating a flow of communications between a remote machine and a mainframe computer in implementing a file transfer, where the file is to be compressed, and where the data read from disk is already compressed, according to various aspects of the present disclosure.

Referring now to FIG. 4, an end-to-end example of the adaptive compression routine 400 is implemented. For instance, as illustrated, a first machine 402, e.g., a mainframe computer, is in data communication with a second machine 404, e.g., a client computer.

The routine 400 comprises generating (e.g., by the second computer 404) a request for data to be communicated across a network from the first machine 402 to the second machine 404, where the data received by the second machine is to be compressed.

The first machine 402 and the second machine 404 establish a checkpoint that is known to both the first machine 402 and the second machine 404, where the checkpoint occurs before the end of the transmission of the requested data.

Additionally, the first machine 402 and the second machine 404 establish a compression requirement to be used by the first machine 402, and a corresponding decompression requirement to be used by the second machine 404, for the requested data. The tight correlation between the compression requirement and decompression requirement guarantees that the second machine 404 will be able to undue whatever processing is performed by the first machine 402 to service the request for data.

A first series of operations is performed at 406 until the checkpoint is reached. Notably here however, the first machine 402 will carry out its processes until it reaches the checkpoint. In this regard, the checkpoint determination is local to the first machine 402. Likewise, in an independent manner, the second machine 404 will carry out its processes until it reaches the checkpoint, i.e., the checkpoint determination in this instance, is local to the second machine 404.

More particularly, the first series of operations at 406 that are performed by the first machine 402 comprise extracting a segment of the data to be communicated as an extracted segment, and processing (e.g., compressing) the extracted segment according to the compression requirement defining a (first machine) processed segment. The operations also include communicating the processed segment across the network to the second machine as a transmitted segment.

Likewise, the first series of operations at 406 that are performed by the second machine 404 comprise receiving a segment of the requested data, processing (e.g., decompressing) the received segment according to the decompression requirement defining a (second machine) processed segment, and storing the processed segment on a storage device accessible to the second machine.

The first machine 402 performs a checkpoint routine at 408 once the designated checkpoint is locally reached by the first machine 402, by determining whether a desired level of performance is achieved in communicating the processed segments to the second machine 404. For instance, the first machine 402 may compare the size of the transmitted data to the size of the corresponding data stored on disk. If the transmitted data is larger than the corresponding stored data, then the data is assumed to be stored in an already compressed state.

The second machine 404 performs a checkpoint routine at 410, which is independent of the checkpoint routine on the first machine 402, once the designated checkpoint is locally reached by the second machine 404. The second machine 404 performs a checkpoint operation by determining whether a desired level of performance is achieved in receiving the processed segments. Here, the second machine 404 uses the same test as the first machine 402 to determine whether the desired level of performance is achieved. Keeping with the above example, the second machine 404 determines whether the received data size is larger than the size of the same data stored on disk.

In the example of FIG. 4, assume that when the first machine 402 performs the checkpoint routine at 410, the transmit size is greater than the stored size for the data communicated before the checkpoint is reached. The first machine 402 concludes that the data stored on disk is already compressed, so it is a waste of CPU cycles to compress the same data again. At the same checkpoint, the second machine 404 independently discovers that the size of the received segments is greater than the size of the segments that have been stored. The second machine 404 also concludes that the received data is already compressed.

As such, the first machine 402 modifies the compression requirement and processes each additional segment based upon the modified compression requirement. For instance, the modified compression requirement may be to turn compression off. Thus, data is considered "processed data" by virtue of the data being extracted from storage. Here, each additional processed segment (extracted but uncompressed segment) is communicated across the network to the second machine 404.

Likewise, the second machine 404 modifies the decompression requirement and processes each additional segment based upon the modified decompression requirement. For instance, the modified decompression requirement may be to turn decompression off, so as to stay correlated with the operations of the first machine 402. Thus, the "processed data" at the second machine 404 may be simply the received data, which is stored by the second machine 404.

The above process continues until another designated checkpoint is reached, the end of the requested data is communicated, etc.

End to End Example 2

Figure 5:
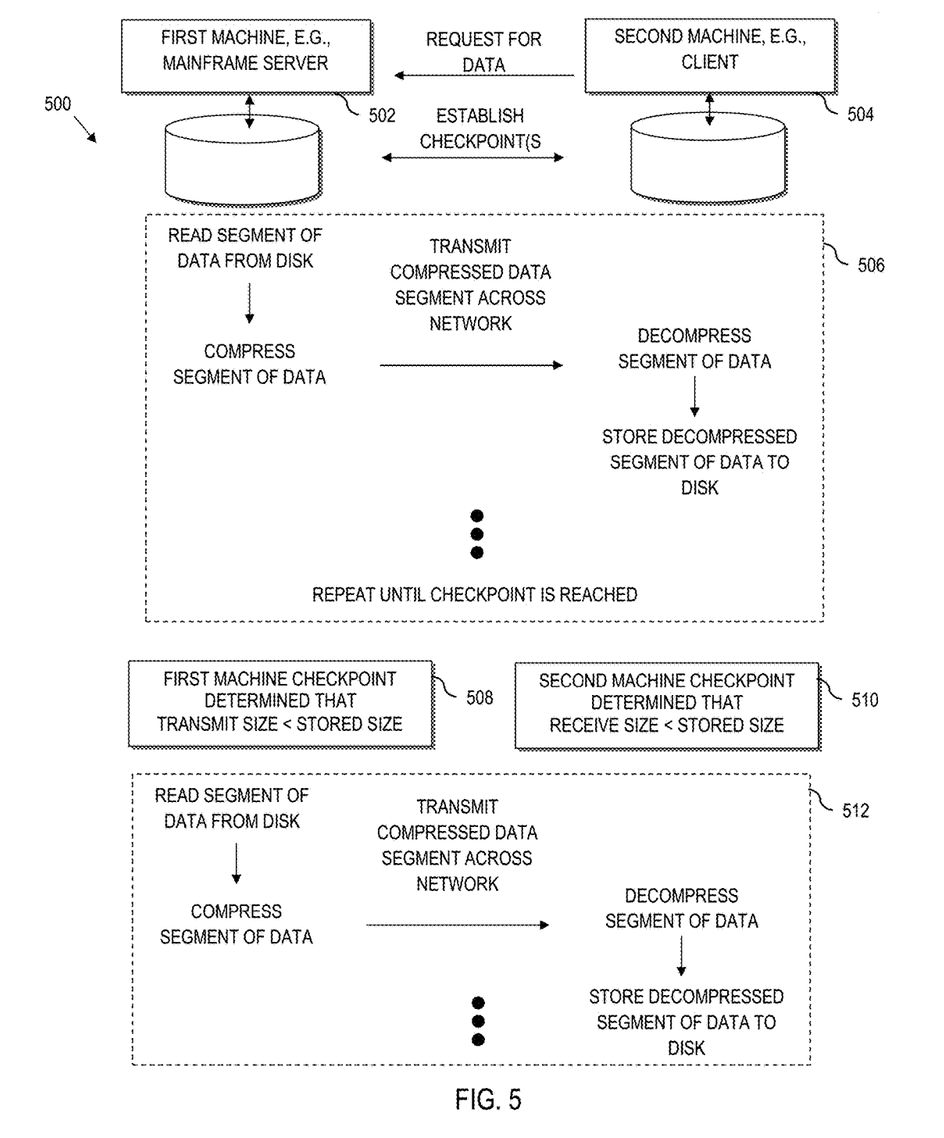
FIG. 5 is a block diagram illustrating a flow of communications between a remote machine and a mainframe computer in implementing a file transfer, where the file is to be compressed, and where the data read from disk is not compressed, according to various aspects of the present disclosure.

Referring now to FIG. 5, an end-to-end example of the adaptive compression routine 500 is implemented. Here, a first machine 502, e.g., a mainframe computer, is in data communication with a second machine 504, e.g., a client computer. The first machine 502 and the second machine 504 are analogous to that set out with regard to the first machine 402 and second machine 404 and FIG. 4. Moreover, the request for data, the establishment of the checkpoint, the compression requirements and decompression requirements are analogous to that set out herein with regard to FIG. 4, and with regard to FIGS. 2-3. Moreover, the routine 500 performs a first series of operations at 506 until the checkpoint is reached. In this regard, the first series of operations at 506 is identical to the first series of operations at 406 of FIG. 4.

The first machine 502 performs a checkpoint routine at 508 once the designated checkpoint is locally reached by the first machine 502. This checkpoint routine is implemented by determining whether a desired level of performance is achieved in communicating the processed segments to the second machine 504, in a manner analogous to the check at 408 of FIG. 4.

The second machine 504 likewise performs a checkpoint routine at 510, which is independent of the checkpoint routine on the first machine 502, once the designated checkpoint is locally reached by the second machine 504. This checkpoint routine is implemented by determining whether a desired level of performance is achieved in receiving the processed segments. The second machine 504 carries out the same test used by the first machine 502, in a manner analogous to the check at 410 of FIG. 4.

However, opposite of the example of FIG. 4, assume that the transmitted size is less than the size of the corresponding data on disk. That means that the data on disk is not compressed. As such, after the checkpoint, the first machine 502 repeats a process identical to that of 506 until a next checkpoint is reached, or until the end of the requested data is reached. Similarly, the received data size is smaller than the size of the same data stored on disk. Thus, the second machine 502 also becomes aware at the checkpoint that the data has been properly compressed once. As such, after the checkpoint, the second machine 504 repeats a process identical to that of 506 until a next checkpoint is reached, or until the end of the requested data is reached.

Figure 6:
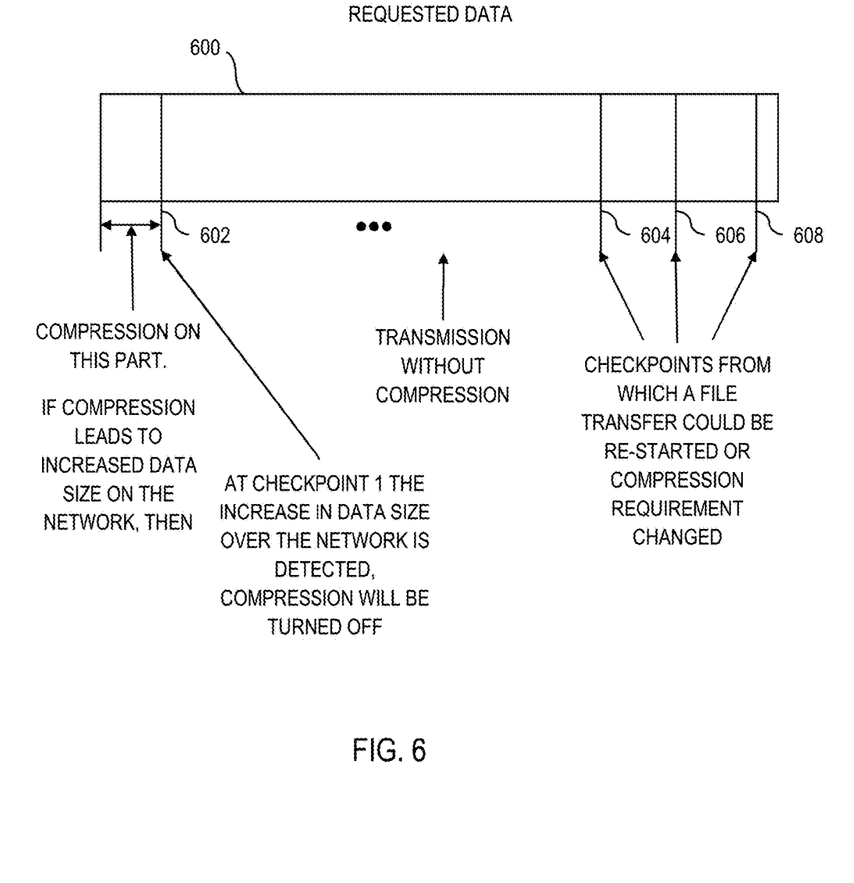
FIG. 6 is a schematic diagram of a file to be transferred to a remote machine, according to aspects of the present invention.

Referring to FIG. 6, a schematic diagram illustrates data 600 responsive to a data request as a continuous block of data to clarify aspects of the present disclosure. Using adaptive compression as set out herein, a checkpoint is set, e.g., at 602. The data up to the checkpoint is transmitted compressed, regardless of how the data is stored on disk. At 602, a determination is made as to whether a desired level of performance is obtained in transmitting the data. For instance, at the checkpoint, if the transmitted file size is greater than the size of the data on disk, then compression is altered, e.g., turned off, modified, etc. Transmission continues where it left off with the altered compression (which may include no compression). An analogous process is carried out on the receiving machine. It is also possible to set additional checkpoints, e.g., at 604, 606 and 608. Each additional checkpoint presents an opportunity to modify the compression to make more efficient use of the mainframe computer CPU.

Figure 7:
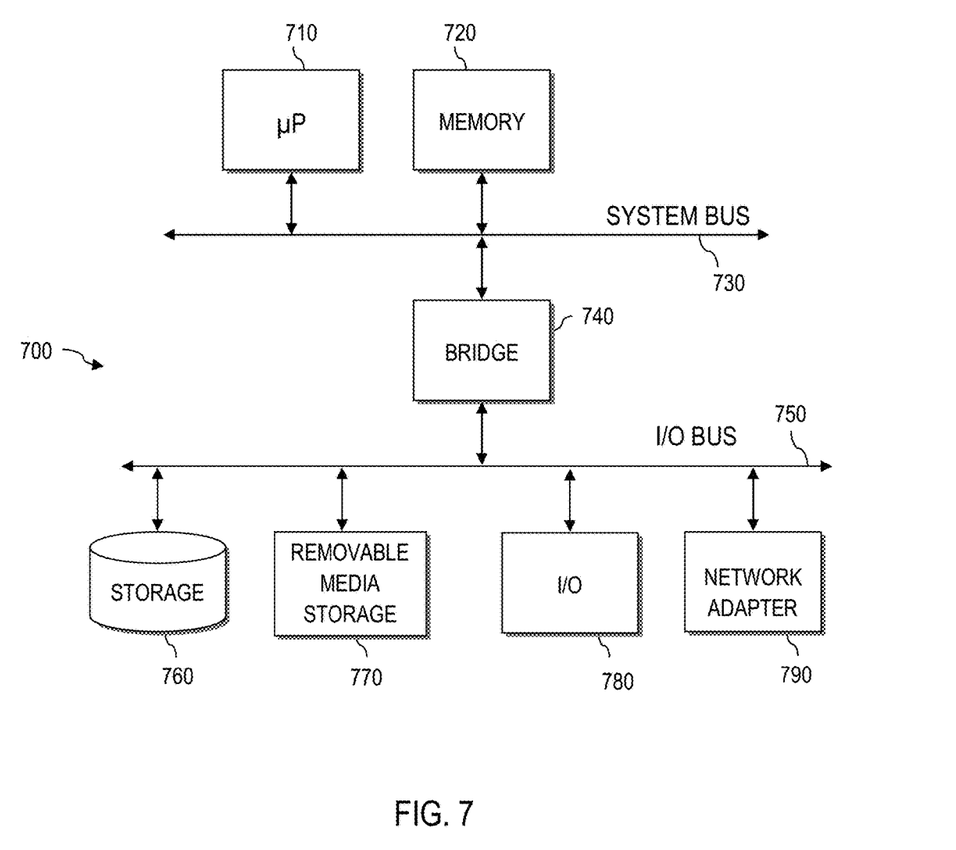
FIG. 7 is a block diagram of a cloud computing environment, according to various aspects of the present disclosure.

Referring to FIG. 7, a schematic block diagram illustrates an exemplary computer system 700 for implementing the various methods described herein. The exemplary computer system 700 includes one or more microprocessors (g) 710 and corresponding memory 720 (e.g., random access memory and/or read only memory) that are connected to a system bus 730. Information can be passed between the system bus 730 and another bus 750 by a suitable bridge 740. The bus 750 is used to interface peripherals with the one or more microprocessors (g) 710, such as storage 760 (e.g., hard disk drives); removable media storage devices 770 (e.g., flash drives, DVD-ROM drives, CD-ROM drives, floppy drives, etc.); I/O devices 780 (e.g., mouse, keyboard, monitor, printer, scanner, etc.); and a network adapter 790. The above list of peripherals is presented by way of illustration and is not intended to be limiting. Other peripheral devices may be suitably integrated into the computer system 700.

The microprocessor(s) 710 control operation of the exemplary computer system 700. Moreover, one or more of the microprocessor(s) 710 execute computer readable code that instructs the microprocessor(s) 710 to implement one or more of the methods herein. The computer readable code may be stored for instance, in the memory 720, storage 760, removable media storage device 770 or other suitable tangible storage medium accessible by the microprocessor(s) 710. The memory 720 can also function as a working memory to store information (e.g., data, an operating system, etc.).

Thus, the exemplary computer system 700 or components thereof can implement one or more of the methods described herein. The exemplary computer system 700 can also provide computer-readable storage device(s) that store code that can be executed to implement one or more of the methods as set out in greater detail herein. Other computer configurations may also implement the methods and computer-readable storage devices as set out in greater detail herein.

Computer program code for carrying out operations for various aspects of the present disclosure set out herein, may be written in any combination of one or more programming languages. The program code may execute entirely on the computer system 700. Alternatively, the program code may execute partly on the computer system 700 and partly on a remote computer. Here, the remote computer may be connected to the computer system 700 through any type of network connection (e.g., using the network adapter 790 of the computer system 700). Still further, the program code may be implemented on a remote computer.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device and specifically does not include a computer-readable signal medium.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving, by a first machine, a request for data to be communicated across a network to a second machine, where the data received by the second machine is to be compressed;
   establishing a checkpoint that is:
      scheduled to occur after a start of a transmission of the requested data and before an end of the transmission of the requested data;
      known by the first machine as a point within the transmission; and
      known by the second machine as a point within the transmission;
   establishing, before transmission of the requested data, a compression requirement to be used by the first machine for the requested data, wherein the compression requirement includes a compression algorithm, wherein the second machine is to use a corresponding decompression requirement that includes a decompression algorithm corresponding to the compression algorithm;
   performing until the checkpoint is reached:
      extracting a segment of the data to be communicated as an extracted segment;
      processing the extracted segment according to the compression requirement, defining a processed segment; and
      communicating the processed segment across the network to the second machine as a transmitted segment, wherein the second machine is configured to process the transmitted segment according to the decompression requirement;
   performing, on the first machine, a checkpoint routine once the established checkpoint is reached, the checkpoint routine comprising determining whether a desired level of performance is achieved in communicating the processed segments to the second machine, wherein
      the checkpoint routine is performed independently of an associated checkpoint routine on the second machine;
      the checkpoint routine on the first machine and the associated checkpoint routine on the second machine are the same; and
      the associated checkpoint routine performed by the second machine includes determining whether a desired level of performance is achieved in receiving the transmitted segments;
   extracting at least one additional segment of the data;
   processing each additional segment based upon the compression requirement where the desired level of performance is achieved;
   modifying the compression requirement by changing the compression algorithm to a changed compression algorithm and processing each additional segment based upon the changed compression algorithm where the desired level of performance is not achieved; and
   communicating each additional processed segment across the network to the second machine, wherein the second machine is configured to:
      process each additional received segment according to the decompression requirement where the desired level of performance of the associated checkpoint routine is achieved; and
      where the desired level of performance of the associated checkpoint routine is not achieved, modify the decompression requirement by changing the decompression algorithm to a changed decompression algorithm that corresponds to the changed compression algorithm, and processing each additional received segment according to the changed decompression algorithm.

2. The method of claim 1, wherein receiving, by a first machine, a request for data to be communicated across a network to a second machine, comprises:
   receiving, by the first machine, the request as a file transfer request that specifies a requirement that the requested file is to be compressed.

3. The method of claim 1, wherein establishing a compression requirement for the requested data, comprises:
establishing a predetermined compression algorithm between the first machine and the second machine when receiving the request.

4. The method of claim 1 further comprising:
receiving in the request for data, at least one of a designation of a desired compression requirement and a desired checkpoint.

5. The method of claim 1, wherein determining whether a desired level of performance is achieved in communicating the processed segments to the second machine, comprises:
determining whether the compression requirement has obtained a desired compression ratio.

6. The method of claim 1, wherein determining whether a desired level of performance is achieved in communicating the processed segments to the second machine, comprises:
comparing a size of the transmitted segments to the size of the extracted segments.

7. The method of claim 1, wherein:
modifying the compression requirement by changing the compression algorithm to a changed compression algorithm, comprises:
turning off compression; and
transmitting at least one additional segment of the requested data based upon the modified compression requirement, comprises:
transmitting the at least one additional segment of the requested data without applying compression.

8. The method of claim 1, wherein:
modifying the compression requirement by changing the compression algorithm to a changed compression algorithm, comprises:
modifying at least one parameter of the compression requirement; and
transmitting at least one additional segment of the requested data based upon the modified compression requirement, comprises:
transmitting the at least one additional segment of the requested data using the modified compression requirement.

9. The method of claim 1, wherein:
modifying the compression requirement by changing the compression algorithm to a changed compression algorithm, comprises:
selecting a different compression algorithm; and
transmitting at least one additional segment of the requested data based upon the modified compression requirement, comprises:
transmitting the at least one additional segment of the requested data using the different compression algorithm.

10. A method comprising:
transmitting a request for data to be communicated across a network from a first machine to a second machine, where the data received by the second machine is to be compressed;
establishing a checkpoint that is:
scheduled to occur after a start of a transmission of the requested data and before an end of the transmission of the requested data;
known by the first machine as a point within the transmission; and
known by the second machine as a point within the transmission;
establishing, before transmission of the requested data, a decompression requirement for the requested data, wherein the decompression requirement includes a decompression algorithm, wherein the first machine is to use a compression requirement including a compression algorithm that corresponds to the decompression algorithm;
performing until the checkpoint is reached:
receiving a segment of the requested data, wherein the received segment was processed by the first machine according to the compression requirement;
processing the received segment according to the decompression requirement, defining a processed segment; and
storing the processed segment on a storage device accessible to the second machine;
performing, on the second machine, a checkpoint routine once the established checkpoint is reached, the checkpoint routine comprising determining whether a desired level of performance is achieved in storing the processed segments, wherein
the checkpoint routine is performed independently of an associated checkpoint routine on the first machine;
the checkpoint routine on the second machine and the associated checkpoint routine on the first machine are the same; and
the associated checkpoint routine performed by the first machine includes determining whether a desired level of performance is achieved in communicating the received segments to the second machine;
receiving, from the first machine, at least one additional segment of the requested data, wherein the first machine is configured to:
process each additional segment based on the compression requirement where the desired level of performance of the associated checkpoint routine is achieved; and
where the desired level of performance of the associated checkpoint routine is not achieved, modify the compression requirement by changing the compression algorithm to a changed compression algorithm and processing each additional segment based on the changed compression algorithm;
processing each additional received segment according to the decompression requirement where the desired level of performance is achieved;
modifying the decompression requirement by changing a decompression algorithm and processing each additional received segment according to the changed decompression algorithm where the desired level of performance is not achieved; and
storing each additional processed segment on the storage device accessible to the second machine.

11. The method of claim 10, wherein transmitting a request for data to be communicated across a network to a first machine by a second machine, comprises:
transmitting the request to the first machines machine as a file transfer request that specifies a requirement that the requested file is to be compressed.

12. The method of claim 10, wherein establishing a decompression requirement for the requested data, comprises:
establishing a predetermined decompression algorithm between the first machine and the second machine before transmitting the request.

13. The method of claim 10 further comprising:
transmitting in the request for data, to the first machine, at least one of a designation of a desired compression requirement and a desired checkpoint.

14. The method of claim 10, wherein determining whether a desired level of performance is achieved in storing the processed segments, comprises:
determining whether the decompression requirement has obtained a desired decompression ratio.

15. The method of claim 10, wherein determining whether a desired level of performance is achieved in storing the processed segments, comprises:
comparing a size of the received segments to the size of the stored segments.

16. The method of claim 10, wherein:
modifying the decompression requirement by changing the compression algorithm to a changed compression algorithm comprises:
turning off decompression; and
storing each additional processed segment on the storage device, comprises:
storing each additional processed segment on the storage device without applying decompression.

17. The method of claim 10, wherein:
modifying the decompression requirement by changing the compression algorithm to a changed compression algorithm comprises:
modifying at least one parameter of the decompression requirement; and
storing each additional processed segment on the storage device, comprises:
storing each additional processed segment on the storage device using the modified decompression requirement.

18. The method of claim 10, wherein:
modifying the decompression requirement by changing the compression algorithm to a changed compression algorithm comprises:
selecting a different decompression algorithm; and
storing each additional processed segment on the storage device, comprises:
storing each additional processed segment on the storage device using the different decompression algorithm.

19. A method comprising:
generating a request for data to be communicated across a network from a first machine to a second machine, where the data received by the second machine is to be compressed;
establishing a checkpoint that is:
scheduled to occur after a start of a transmission of the requested data and before an end of the transmission of the requested data;
known by the first machine as a point within the transmission; and
known by the second machine as a point within the transmission;
establishing, before transmission of the requested data, a compression requirement to be used by the first machine, and a corresponding decompression requirement to be used by the second machine, for the requested data, wherein the compression requirement includes a compression algorithm and the decompression requirement includes a decompression algorithm corresponding to the compression algorithm;
performing by the first machine, until the checkpoint is reached by the first machine:
extracting a segment of the data to be communicated as an extracted segment;
processing the extracted segment according to the compression requirement defining a first machine processed segment; and
communicating the first machine processed segment across the network to the second machine as a transmitted segment;
performing by the second machine until the checkpoint is reached by the second machine:
receiving a segment of the requested data;
processing the received segment according to the decompression requirement, defining a second machine processed segment; and
storing the second machine processed segment on a storage device accessible to the second machine;
performing a first checkpoint routine by the first machine once the established checkpoint is reached by the first machine, comprising determining whether a desired level of performance is achieved in communicating the processed segments to the second machine;
performing a second checkpoint routine on the second machine, which is performed independently of the first checkpoint routine on the first machine, once the established checkpoint is reached by the second machine, comprising determining whether a desired level of performance is achieved in receiving the processed segments, wherein the first checkpoint routine is the same as the second checkpoint routine;
performing by the first machine in response to the first checkpoint routine:
extracting at least one additional segment of the data;
processing each additional segment based upon the compression requirement where the desired level of performance of the first checkpoint routine is achieved;
modifying the compression requirement by changing the compression algorithm to a changed compression algorithm and processing each additional segment based upon the changed compression algorithm where the desired level of performance of the first checkpoint routine is not achieved; and
communicating each additional processed segment across the network to the second machine; and
performing by the second machine in response to the second checkpoint routine:
receiving at least one additional segment of the requested data;
processing each additional received segment according to the decompression requirement where the desired level of performance of the second checkpoint routine is achieved;
modifying the decompression requirement by changing the decompression algorithm to a changed decompression algorithm, wherein the changed decompression algorithm corresponds to the changed compression algorithm, and processing each additional received segment according to the changed decompression algorithm where the desired level of performance of the second checkpoint routine is not achieved; and
storing each additional processed segment on the storage device accessible to the second machine.

20. The method of claim 19, wherein:
performing a first checkpoint routine further comprises performing, locally on the first machine, a first checkpoint compression routine that determines whether a desired level of compression performance is achieved through the compression requirement; and performing a second checkpoint routine further comprises performing, locally on the second machine, a second checkpoint decompression routine that determines whether a desired level of decompression performance is achieved through the decompression requirement.

\* \* \* \* \*